United States Patent
Ngoua Teu Magambo et al.

(10) Patent No.: US 11,736,027 B2
(45) Date of Patent: Aug. 22, 2023

(54) ISOLATED AND RECONFIGURABLE POWER CONVERTER

(71) Applicant: SAFRAN, Paris (FR)

(72) Inventors: Jean-sylvio Ngoua Teu Magambo, Moissy-Cramayel (FR); Cyrille Gautier, Moissy-Cramayel (FR)

(73) Assignee: SAFRAN, Paris (FR)

( * ) Notice: Subject to any disclaimer, the term of this patent is extended or adjusted under 35 U.S.C. 154(b) by 156 days.

(21) Appl. No.: 17/435,775

(22) PCT Filed: Mar. 12, 2020

(86) PCT No.: PCT/FR2020/000055
§ 371 (c)(1),
(2) Date: Sep. 2, 2021

(87) PCT Pub. No.: WO2020/183076
PCT Pub. Date: Sep. 17, 2020

(65) Prior Publication Data
US 2022/0052611 A1 Feb. 17, 2022

(30) Foreign Application Priority Data
Mar. 14, 2019 (FR) ..................... 1902617

(51) Int. Cl.
*H02M 3/335* (2006.01)
*H02M 7/48* (2007.01)
*H02M 7/219* (2006.01)

(52) U.S. Cl.
CPC ....... *H02M 3/33584* (2013.01); *H02M 7/219* (2013.01); *H02M 7/4818* (2021.05)

(58) Field of Classification Search
CPC ......... H02M 3/33576; H02M 3/33584; H02M 7/4815; H02M 7/4818; H02M 7/217; H02M 7/219
See application file for complete search history.

(56) References Cited

U.S. PATENT DOCUMENTS

2013/0265804 A1 10/2013 Fu et al.
2019/0386572 A1* 12/2019 Itoh .................. H02M 1/40
2022/0103080 A1* 3/2022 Yang ................. H02M 1/15

FOREIGN PATENT DOCUMENTS

CN 109302070 A 2/2019
EP 2 863 531 A1 4/2015

OTHER PUBLICATIONS

European Office Action dated Sep. 7, 2022, issued in corresponding European Patent Application No. EP 20 721 676.3, filed Apr. 30, 2020, 7 pages.
International Search Report dated Jul. 14, 2020, issued in corresponding International Application No. PCT/FR2020/000055, filed Mar. 12, 2020, 7 pages.

(Continued)

*Primary Examiner* — Adolf D Berhane
(74) *Attorney, Agent, or Firm* — Christensen O'Connor Johnson Kindness PLLC

(57) ABSTRACT

A power conversion system for an aircraft on-board power system converts high voltage DC to low voltage DC and vice versa. The system includes switching means configured so that the system operates in a plurality of configurations, each forming an isolated DC/DC converter.

15 Claims, 2 Drawing Sheets

(56) References Cited

OTHER PUBLICATIONS

Written Opinion dated Jul. 14, 2020, issued in corresponding International Application No. PCT/FR2020/000055, filed Mar. 12, 2020, 8 pages.
Jalbrzykowski et al.; "A Dual Full-Bridge Resonant Class-E Bidirectional DC-DC Converter"; IEEE Transactions on Industrial Electronics; Sep. 2011 (Sep. 1, 2011); pp. 3879-3883; vol. 58, No. 9; IEEE Service Center, Piscataway, NJ, USA.
Zhong et al.; "Reconfigurable Wireless Power Transfer Systems With High Energy Efficiency Over Wide Load Range"; IEEE Transactions on Power Electronics; Jul. 1, 2018 (Jul. 1, 2018); pp. 6379-6390; vol. 33, No. 7; Institute of Electrical and Electronics Engineers, USA.

* cited by examiner

ISOLATED AND RECONFIGURABLE POWER CONVERTER

TECHNICAL FIELD OF THE INVENTION

The present invention relates to on-board power systems in aircraft, and in particular to the structure of power converters integrated into such power systems.

PRIOR ART

In order to power the equipment on board an aircraft, many power converters are used, allowing various devices to be powered at low DC voltage from the aircraft's high DC voltage network.

Many types of power converters are available in the state of the art, and are chosen with regard to the DC voltage level of the aircraft's network and the desired voltage level for the correct operation of the devices, as well as with regard to the control of the converter. In particular, the most decisive control parameters are the switching frequency, the duty cycle(s) and the phase shift between the power bridges. However, other parameters such as dead times (switching delays between two power arms) can also impact on the quality of the control.

Typically, the high voltage DC network on board the aircraft delivers a nominal DC voltage of about 270 V. However, the voltage delivered by this network can vary greatly, and can therefore be 10% or even 20% higher or lower than the nominal voltage. This high variation, which can be related to the load of the grid or to the instability of the electricity production, impacts the operating point of the converter. The latter having been chosen and dimensioned to convert a high DC voltage of 270V into a low DC voltage varying between 16V and 30V, the operation of the converter is no longer optimised when the voltage delivered by the on-board high DC voltage network varies.

Two examples of the state of the art converters are shown in FIGS. 1 and 2.

FIG. 1 shows an example of an isolated DC/DC conversion structure, also known as a Dual Active Bridge (DAB).

The structure comprises a power converter, comprising in particular an insulated transformer 4, capable of converting a high DC voltage V1 applied across a first H-bridge, into a low DC voltage V2 applied across a second H-bridge. The two H-bridges 6, 8 comprise four transistors 10a, 10b, 12a, 12b and 14a, 14b, 16a, 16b respectively.

The primary terminals 18a, 18b of the transformer 4 are connected to a first 10 and a second 12 branch of the first H-bridge 6. In particular, an inductance 22 is arranged between one of the primary terminals 18a of the transformer 4 and the second branch 12 of the first H-bridge 6.

The inductance 22, also known as leakage inductance, can generate overvoltages when the current in the transformer is cut off.

The secondary terminals 20a, 20b of the transformer 4 are connected to a first 14 and a second 16 branch of the second H-bridge 8.

Capacitors 24, 26 may be arranged across each of the first 6 and second 8 H-bridges. These are filter capacitors, their role being to reduce ripples in the input and output voltages of the converter. The resistor models the devices powered by the voltage V2 delivered at the output of the conversion structure 2.

Such a conversion structure 2 can be used to convert, at a fixed frequency which can be in a range of 10 kHz to 1 MHz, the high voltage V1 between 220V and 330V into a low voltage V2 between 16V and 32V (note that by replacing the resistor 28 by a voltage source, the structure becomes reversible, V2 becomes the input voltage and V1 the output voltage).

In the second example of the conversion structure 30 shown in FIG. 2, the transformer 4 converts a high DC voltage V1 into a low DC voltage V2, the latter being applied respectively to the terminals of a first bridge at H 6 and a second bridge at H 8, both of which respectively consist of four transistors 10a, 10b, 12a, 12b and 14a, 14b, 16a, 16b.

In addition to a leakage inductance 22, an inductance 32, also known as a magnetisation inductance, is arranged between the primary terminals 18a, 18b of the transformer 4. Also, a capacitor 34 is arranged between one of the primary terminals 18b of the transformer 4 and the first branch 10 of the first H-bridge 6.

Such a conversion structure 30 thus comprises a resonant structure consisting of the inductances 22 and 32 and the capacitor 34 and is also referred to as a series-parallel resonant conversion structure LLC. The resonant structure provides a sinusoidal current output and converts at a variable frequency which can be between 100 kHz and 3000 kHz depending on the load variation of the on-board network. The input and output ranges are the same as for the DAB structure, i.e. between 220V and 330V and between 16V and 32V respectively.

Thus, the structure 2 illustrated in FIG. 1 is optimised, with a simple control, for a high voltage applied at the input at the nominal level of 270V and the structure 30 illustrated in FIG. 2 is optimised for a high voltage applied at the input between 220V and 330V. Outside these ranges, these two conversion structures 2, 30 do not behave optimally, and are therefore each limited, when there are variations in the voltage delivered by the aircraft's on-board high voltage DC network.

The invention aims to remedy such drawbacks in a simple, reliable and inexpensive way.

SUMMARY OF THE INVENTION

The present document relates to a power conversion system, for an aircraft on-board power system, capable of converting a high DC voltage to a low DC voltage and vice versa, the system comprising:

- at least one first high-voltage DC bus $V_{bus1}$ and at least one second low-voltage DC bus $V_{bus2}$;
- a first H-bridge arranged between terminals of the first bus and comprising a first and a second branch;
- a second H-bridge arranged between terminals of the second bus and comprising a first and a second branch;
- a power converter, capable of transforming a high DC voltage $V_{bus1}$ into a low DC voltage $V_{bus2}$ and/or vice versa, comprising a first and a second primary terminal and at least a first and a second secondary terminal connected respectively to the first branch and the second branch of the second H-bridge;
- at least a first inductance arranged in series between the second branch of the first H-bridge and the first primary terminal of the power converter; characterized in that the system further comprises:
- at least one first capacitor, a first terminal of which is connected to the first branch of the first H-bridge;
- at least one second capacitor, a first terminal of which is connected to the first primary terminal of the power converter;

a switching means capable of controlling the opening or closing of the current flow, these switching means being configured in such a way that the system operates according to the following configurations:
  a first isolated DC/DC converter configuration in which the second primary terminal of the power converter is connected to the first branch of the first H-bridge;
  a second isolated DC/DC converter configuration comprising a resonant circuit formed by:
    the first inductance, and
  the first capacitor, a second terminal of which is connected to the second primary terminal of the power converter;
  a third configuration forming an isolated DC/DC converter comprising a resonance circuit formed by:
    the first capacitor, a second terminal of which is connected to the second primary terminal of the power converter,
    the second capacitor, a second terminal of which is connected to the second primary terminal of the power converter, and
    the first inductance.

Such a system thus enables the operation of the power converter to be optimised, offering at least three operating configurations. Thus, depending on the input operating range, the system operates in one of three configurations via switching means, thus enabling a wider operating range to be covered than with a system having a fixed configuration.

The system can thus operate in a first configuration similar to a DAB isolated conversion structure, a second configuration similar to an isolated conversion structure comprising an LC resonance circuit, and a third configuration similar to an isolated conversion structure comprising an LCC resonance circuit. Thus, the switching means means that that the resonance circuits can be activated, or not, depending on the desired conversion system configuration.

With a relatively simple control, it is then possible to reconfigure the conversion system, maintaining a good level of efficiency of the power conversion system.

The present reconfigurable converter system is therefore electromagnetically compatible (EMC). The reduction in EMC stresses is mainly due to the extension of the switching frequency range. Indeed, by increasing the values of these frequencies, it would be possible to decrease the size of the passive components that make up the EMC filter.

The switching means may comprise a first switch, a second switch and a third switch. According to another feature of the conversion system:
  the first switch can be arranged between the first capacitor and the second primary terminal of the power converter;
  the second switch can be arranged between the first H-bridge branch and the second primary terminal of the power converter;
  the third switch can be arranged between the second capacitor and the second primary terminal of the power converter.

Thus, by opening and/or closing the switches, it is possible to reconfigure the conversion system to operate:
  as a DAB structure, where the leakage inductance is part of the structure. In response to a relatively simple control such as Phase-Shift modulation, the optimum operating range is restricted to the nominal point of an input voltage equal to 270V±5% and an output voltage equal to 28V±5%;
  as an isolated conversion structure comprising an LLC resonance circuit formed by the inductances and capacitor. In response to a relatively simple control, this structure is adapted to varying loads and voltages, with a switching frequency varying in a small range. This converter can operate with an input voltage of 270 V±20% and an output voltage between 16V and 32V.
  as an isolated conversion structure comprising an LCC resonance circuit formed by the inductance and capacitors. In response to a relatively simple control, this structure is suitable for load and voltage variations, with a switching frequency varying over a wide range. This converter can operate with an input voltage of 270 V±20% and an output voltage between 16V and 32V.

The switching means may comprise a reconfiguration module, capable of individually controlling the first, second and third switches so as to keep them in an open and/or closed state.

The control via this reconfiguration module allows central switching between the three configurations.

In particular, the reconfiguration module can control the first, second and third switches so that:
  in the first configuration, the first switch is kept closed, and the second and third switches are kept open;
  in the second configuration, the second switch is kept closed, and the first and third switches are kept open;
  in the third configuration, the first switch is kept open, and the second and third switches are kept closed.

The system may include a second inductance, arranged between the primary terminals of the power converter, so that in the second configuration the resonance circuit is formed by the first inductance, the second inductance and the first capacitor, a second terminal of which is connected to the second primary terminal of the power converter.

Thus, the second configuration can operate as an isolated converter structure comprising an LLC resonance circuit formed by the inductances, and the capacitor in an input voltage range taking values between 220V and 330V with a variable switching frequency in a reduced range. The first switch, second switch and third switch may comprise switches and transistors.

Thus, the use of controllable switches, such as switches and transistors, makes it possible to switch between the three configurations of the conversion system by means of simple control of these switches. The switches used can be electrical and/or mechanical. Also, the transistors used can be, for example, bipolar transistors, insulated gate bipolar transistors, metal-oxide gate field effect transistors, gallium nitride transistors.

A capacitor Cbus1 can be arranged between the terminals of the second branch of the first H-bridge. Similarly, a capacitor Cbus2 can be arranged between the terminals of the second branch of the second H-bridge. These capacitors filter the voltage ripples of the DC voltage buses.

The first and/or second H-bridge may each comprise at least four power components. The four power components of the first bridge can be either transistors or transistors with diodes in anti-parallel. The four power components of the first bridge can be either diodes or transistors. Preferably, diodes are only used for the second H-bridge, as the first H-bridge requires controllable switches to provide an AC voltage at the transformer input.

The system may comprise a third low voltage DC bus Vbus3 and wherein the power converter comprises third and fourth secondary terminals connected respectively to a first branch and a second branch of a third H-bridge arranged across the third high voltage DC bus Vbus3.

The system may have an operating range of between 220 V and 330 V at the terminals of the first bus.

DETAILED DESCRIPTION OF THE INVENTION

Figure 1:
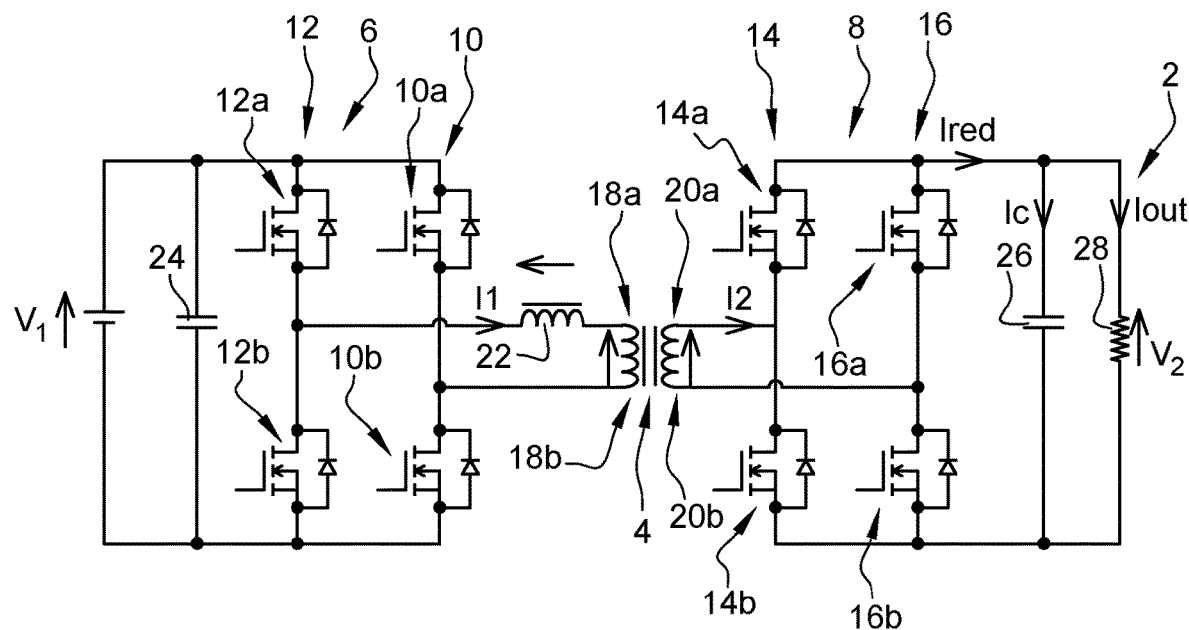
FIG. 1 already described above, shows an isolated DC/DC conversion structure of the Dual Active Bridge (DAB) type of the prior art.
Figure 2:
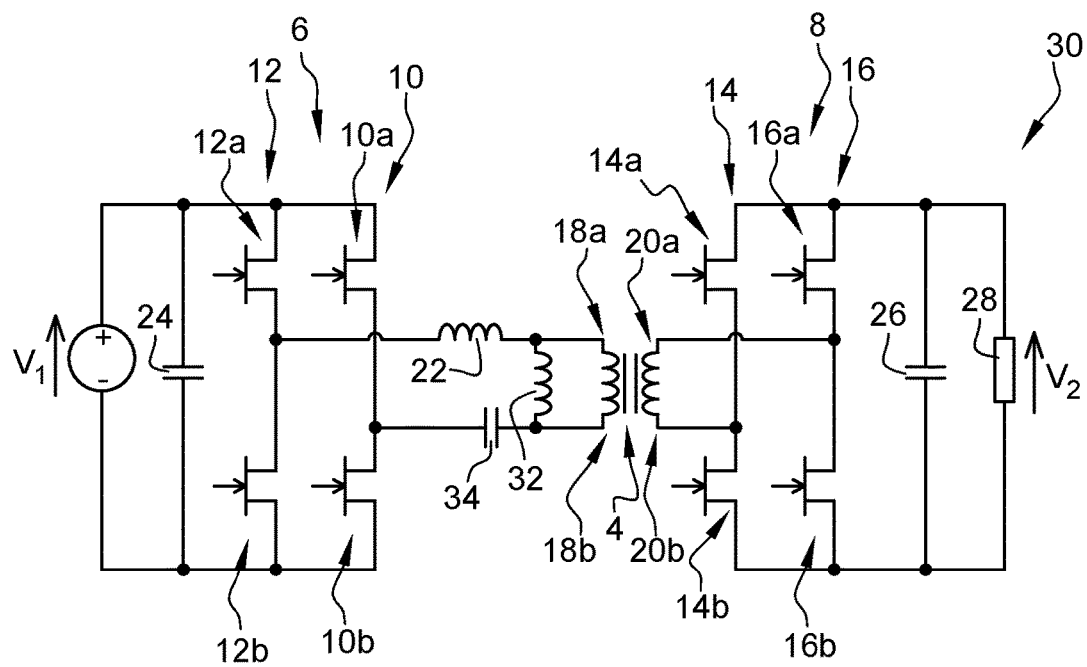
FIG. 2 already described above, represents a second isolated DC/DC conversion structure of the prior art.
Figure 3:
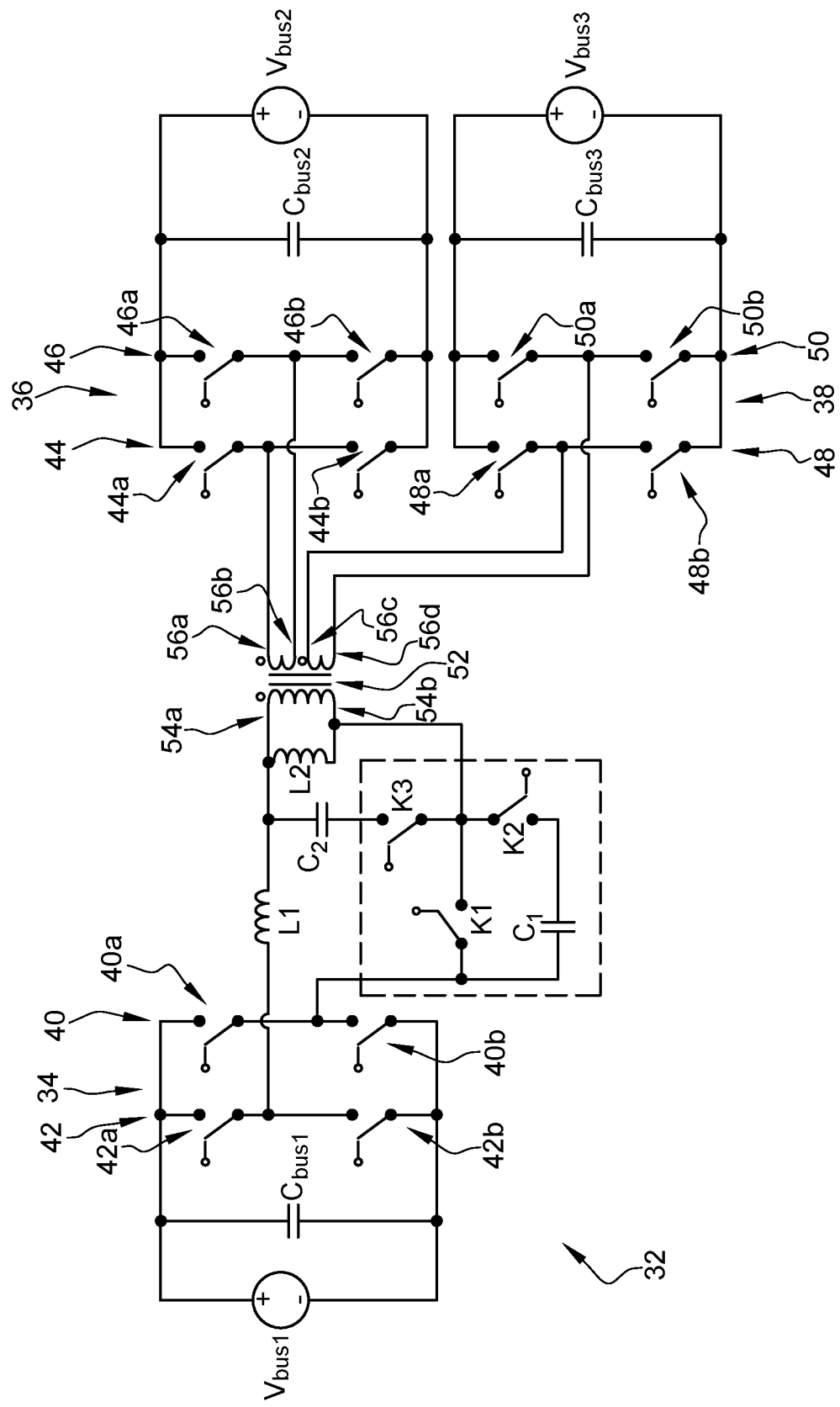
FIG. 3 shows the conversion system according to the invention of this application.

Reference is made hereafter to FIG. 3 representing the power conversion system 32 according to the invention intended to convert a high DC voltage $V_{bus1}$, delivered by the on-board electrical network of an aircraft, into at least one low DC voltage $V_{bus2}$, the level of which is adapted to supply the various equipment of the aircraft, such as, for example, the emergency wind turbines (known by the acronym RAT meaning Ram air turbine), batteries, etc.

The conversion system 32 shown in FIG. 3 is able to convert a high DC voltage $V_{bus1}$ into two low DC voltages $V_{bus2}$ and $V_{bus3}$, not necessarily identical, able to supply various aircraft equipment.

The power conversion system 32 may also be able to perform the conversion in reverse. In this case, some of the power components of the system are chosen accordingly as will be detailed later.

The circuit diagram shown in FIG. 3 is a simplified representation of the conversion system 32 according to the invention. For simplicity, the aircraft's on-board network is represented by a first high voltage DC bus $V_{bus1}$, and two low voltage DC buses are represented by a second low voltage DC bus $V_{bus2}$ and a third low voltage DC bus $V_{bus3}$ suitable for powering the aircraft's equipment.

These three voltage buses are respectively across the capacitors $C_{bus1}$, $C_{bus2}$ and $C_{bus3}$. These three capacitors are filter capacitors which reduce the voltage variations at the input and output of the converter, i.e. smooth the converted voltages.

The conversion system 32 also comprises a first 34, a second 36 and a third 38 H-bridge. Each of these bridges 34, 36, 38 comprising a first branch 40, 44, 48 and a second branch 42, 46, 50. The first H-bridge 34 is arranged across the capacitor $C_{bus1}$, the second H-bridge 36 is arranged across the capacitor $C_{bus2}$ and the third H-bridge 38 is arranged across the capacitor $C_{bus3}$. Thus, the voltage across the first H-bridge 34 is equal to the voltage $V_{bus1}$ of the first high voltage DC bus. Also the voltages at the terminals of the second 36 and third 38 H-bridges are respectively equal to the voltage $V_{bus2}$ of the second low voltage DC bus and to the voltage $V_{bus3}$ of the third low voltage DC bus, both intended to supply the on-board equipment.

As the structure of an H-bridge is known to the skilled person, a brief description is given below. Each of these H-bridges comprises a first branch 40, 44, 48 and a second branch 42, 46, 50, two branches 40, 44, 48 and 42, 46, 50 whose ends are electrically connected to each other in pairs. On each of the first branch 40, 44, 48 and second branch 42, 46, 50 are arranged two switching means 40a, 40b, 44a, 44b, 48a, 48b and 42a, 42b, 46a, 46b, 50a, 50b which are identical on all branches 40, 44, 48 and 42, 46, 50. These switching means 40a, 40b, 44a, 44b, 48a, 48b and 42a, 42b, 46a, 46b, 50a, 50b may be uni or bi-directional, controllable or non-controllable power components. Preferably, the first H-bridge 34 comprises controlled power components, i.e. transistors or switches, uni or bi-directional. The second 36 and third 38 H-bridges may comprise controlled or uncontrolled power components, i.e. transistors, diodes and switches. In the case where the conversion system is capable of converting in both directions, only bi-directional transistors or switches can be used for the second 36 and third 38 H-bridges.

Thus, as can be seen in FIG. 3, the ends of the second branches of the first 34, second 36 and third 38 H-bridges are electrically connected to the terminals of capacitors $C_{bus1}$, $C_{bus2}$ and $C_{bus3}$ respectively.

The system 32 further comprises a power converter 52 which is here more particularly a transformer. The transformer 52 is said to be high frequency, single phase, as known in the state of the art, capable of converting the high AC voltage from the first bridge 34 into a low AC voltage from the second bridge 36 and into a low AC voltage from the third bridge 38 and/or vice versa. The transformer 52 comprises first 54a and second 54b primary terminals and first 56a, second 56b, third 56c and fourth 56d secondary terminals.

The first 34, second 36 and third 38 H-bridges are electrically connected to the primary terminals 54a, 54b and secondary terminals 56a, 56b, 56c, 56d of the power converter 32. As can be seen in FIG. 3, the first secondary terminal 56a is electrically connected to the first branch 44 of the second H-bridge 36, in particular to the two power components 44a and 44b.

Similarly, the second secondary terminal 56b is electrically connected to the second branch 46 of the second H-bridge 36, in particular to the two power components 46a and 46b.

The third secondary terminal 56c is electrically connected to the first branch 48 of the third H-bridge 38, in particular to the two power components 48a and 48b. Similarly, the fourth secondary terminal 56d is electrically connected to the second branch 50 of the third H-bridge 38, in particular to the two power components 50a and 50b.

Finally, the first primary terminal 54a is indirectly and electrically connected to the second branch 42 of the first H-bridge 34, in particular to the two power components 42a and 42b. Similarly, the second primary terminal 54b is indirectly and electrically connected to the first branch 40 of the first H-bridge 34, in particular to the two power components 40a and 40b. Components are arranged between the second branch 42 and the first primary terminal 54a and between the first branch 40 and the second primary terminal 54b.

A first inductance L1 is arranged in series between the second branch 42 of the first H-bridge 34 and the first primary terminal 54a of the power converter 52. This first inductance L1 can, if the high-frequency transformer is sized and optimised accordingly, be replaced by the transformer leakage inductance, which is a transformer fault limiting the transformers converted power.

A second inductance L2 is arranged between the primary terminals 54a, 54b of the power converter 52. This second inductance L2 can, if the high-frequency transformer 52 is sized and optimised accordingly, be replaced by the transformers magnetisation inductance, which is the self-inductance of the transformers primary winding.

A first capacitor C1, a first terminal of which is connected to the first branch 40 of the first H-bridge 34 and a second terminal of which can be connected to the second primary terminal 54b of the power converter 52 via a first switch K1. Thus, the first switch K1 is arranged between the first capacitor C1 and the second primary terminal 54b of the power converter 52. A second capacitor C2, a first terminal of which is connected to the first primary terminal 54a of the power converter 52 and a second terminal of which can be connected to the second primary terminal 54b of the power converter 52 via a third switch K3. Thus, the third switch K3 is arranged between the second capacitor C2 and the second primary terminal 54b of the power converter 52.

A second switch is arranged between the first branch 40 of the first H-bridge 34 and the second primary terminal 54b of the power converter 52.

The three switches K1, K2 and K3 are electrical or mechanical switches and/or controllable transistors, which in part form switching means capable of controlling the opening or closing of the current flow. In particular, the switching means comprise a reconfiguration module capable of individually controlling the switches K1, K2 and K3 so as to keep them in an open and/or closed state.

Thus, switches K1, K2 and K3 are arranged to allow the system to operate in three configurations.

The conversion system 32 is configured in the first configuration when the reconfiguration module controls the first switch K1 to keep it closed, and controls the second K2 and third K3 switches to keep them open. In the first configuration, the converter system 32 forms an isolated Dual Active Bridge DC/DC converter. In this configuration, the second primary terminal 54b of the power converter 52 is directly connected to the first branch 40 of the first H-bridge 34. With a simple control, this configuration is particularly suitable for a voltage $V_{bus1}$ close to the nominal voltage of 270V with a variation of about 5% around this value.

The conversion system 32 is configured in the second configuration when the reconfiguration module controls the second switch K2 to keep it closed, and the first K1 and third K3 switches to keep them open. In this second configuration, the converter system 32 forms an isolated DC/DC converter with a resonance circuit formed by:
the first inductance L1,
the second inductance L2, and
the first capacitor C1, a second terminal of which is connected to the second primary terminal of the power converter.

The LLC resonance circuit formed by L1, L2 and C1 makes the converter system 32 particularly suitable for a voltage $V_{bus1}$ in the range [220V; 330V] with a small required switching frequency range of between fmin and three times fmin (50 kHz<fmin<500 kHz) and operation in continuous or discontinuous conduction mode.

The conversion system 32 is configured in the third configuration when the reconfiguration module controls the first switch K1 to keep it open, and the second K2 and third K3 switches to keep them closed. In this third configuration, the converter system 32 forms an isolated DC/DC converter with a resonance circuit formed by:
the first capacitor C1, a second terminal of which is connected to the second primary terminal of the power converter,
the second capacitor C2, a second terminal of which is connected to the second primary terminal of the power converter, and
the first inductance L1.

The LCC resonance circuit formed by L1, C1 and C2 makes the converter system particularly suitable for a voltage $V_{bus1}$ in the range [220V; 330V] with a wide switching frequency range required and operation only in discontinuous conduction mode, i.e. a switching frequency between 50 kHz and 3 MHz.

Table 1 summarises the status of switches K1, K2, K3 in each of the three configurations:

TABLE 1

|    | Configuration 1-DAB | Configuration 2-LLC | Configuration 3-LCC |
|----|---------------------|---------------------|---------------------|
| K1 | Closed              | Open                | Open                |
| K2 | Open                | Closed              | Closed              |
| K3 | Open                | Open                | Closed              |

Thus, depending on the variation of the voltage $V_{bus1}$ delivered by the aircraft's on-board network, the reconfiguration module controls the switches so as to ensure the operation of the conversion system 32 according to a configuration adapted to the voltage $V_{bus1}$.

With a simple control of the structure (e.g. phase-shift control), which continues even when the configuration is changed, the switching conditions for optimal operation are as follows:
Nominal operating point (input voltage equal to 270V and output voltage equal to 28V): Configuration 1 in DAB.
Operating points different from nominal, discontinuous conduction with a wide frequency range: Configuration 3 in LCC.
Operating points different from nominal, in continuous conduction with a reduced frequency range: Configuration 2 in LLC.

The invention claimed is:
1. A power-conversion system, for an aircraft on-board power system configured to convert high DC voltage to low DC voltage and vice versa, the system comprising:
at least one first high-voltage DC bus $V_{bus1}$ and at least one second low-voltage DC bus $V_{bus2}$;
a first H-bridge arranged between terminals of the first bus and comprising a first and a second branch;
a second H-bridge arranged between terminals of the second bus and comprising a first and a second branch;
a power converter, configured to transform a high DC voltage $V_{bus1}$ into a low DC voltage $V_{bus2}$ and/or vice versa, the power converter comprising a first and a second primary terminal and at least a first and a second secondary terminal connected, respectively, to the first branch and the second branch of the second H-bridge;
at least a first inductance L1 arranged in series between the second branch of the first H-bridge and the first primary terminal of the power converter;
at least one first capacitor C1, a first terminal of which is connected to the first branch of the first H-bridge;
at least one second capacitor C2, a first terminal of which is connected to the first primary terminal of the power converter; and
a switching means configured to control the opening or closing of the current flow, these switching means being configured in such a way that the system operates according to the following configurations:
a first isolated DC/DC converter configuration in which the second primary terminal of the power converter is connected to the first branch of the first H-bridge;
a second isolated DC/DC converter configuration comprising a resonance circuit formed by:
the first inductance (L1), and the first capacitor (C1), a second terminal of which is connected to the second primary terminal of the power converter; and a third configuration forming an isolated DC/DC converter comprising a resonance circuit formed by:

the first capacitor (C1), a second terminal of which is connected to the second primary terminal of the power converter, the second capacitor (C2), a second terminal of which is connected to the second primary terminal of the power converter, and the first inductance L1.

2. The system according to claim 1, wherein the switching means comprises a first (K1), a second (K2) and a third (K3) switch.

3. The system according to claim 1, wherein:

the first switch K2 is arranged between the first capacitor C1 and the second primary terminal of the power converter;

the second switch K1 is arranged between the first branch of the first H-bridge and the second primary terminal of the power converter; and the third switch (K3) is arranged between the second capacitor (C2) and the second primary terminal of the power converter.

4. The system according to claim 2, wherein the switching means comprises a reconfiguration module, configured to individually control the first, second and third switches to maintain the first, second and third switches in an open and/or closed state.

5. The system according to claim 4, wherein the reconfiguration module controls the first, second and third switches such that:

in the first configuration, the first switch (K1) is kept closed, and the second (K2) and third (K3) switches are kept open;

in the second configuration, the second switch (K2) is kept closed, and the first (K1) and third (K3) switches are kept open; and in the third configuration, the first switch (K1) is kept open, and the second (K2) and third (K3) switches are kept closed.

6. The system according to claim 1, further comprising a second inductance (L2), arranged between the primary terminals of the power converter, so that in the second configuration, the resonance circuit is formed by the first inductance (L1), the second inductance (L2) and the first capacitor (C1), a second terminal of which is connected to the second primary terminal of the power converter.

7. The system according to claim 2, wherein the first (K1), second (K2) and third (K3) switches comprise switches and/or transistors.

8. The system according to claim 1, wherein a capacitor Cbus1 is arranged between the terminals of the second branch of the first H-bridge.

9. The system according to claim 1, wherein a capacitor Cbus2 is arranged between the terminals of the second branch of the second H-bridge.

10. The system according to claim 1 having an operating range between 220 V and 330 V at the terminals of the first bus.

11. The system according to claim 1, wherein the power converter is an isolated, single-phase transformer.

12. The system according to claim 1, further comprising a third high voltage DC bus Vbus3, wherein the power converter comprises third and fourth secondary terminals connected, respectively, to a first branch and a second branch of a third H-bridge arranged across the third high voltage DC bus Vbus3.

13. The system according to claim 1, wherein the first and/or second H-bridge each comprises four power components.

14. The system according to claim 13, wherein the four power components of the first bridge are transistors.

15. The system according to claim 13, wherein the four power components of the first bridge are either diodes or transistors.

* * * * *